June 29, 1965  E. S. PRICHARD  3,191,963
RETRACTABLE AXLE FOR VEHICLE LOAD DISTRIBUTION
Filed Jan. 13, 1964  5 Sheets-Sheet 4

INVENTOR.
EVAN S. PRICHARD
BY
MAHONEY, HALBERT &
HORNBAKER
ATTORNEYS

June 29, 1965 E. S. PRICHARD 3,191,963
RETRACTABLE AXLE FOR VEHICLE LOAD DISTRIBUTION
Filed Jan. 13, 1964 5 Sheets-Sheet 5

*Fig.12.*

INVENTOR
EVAN S. PRICHARD
BY
MAHONEY, HALBERT &
HORNBAKER
ATTORNEYS

United States Patent Office 3,191,963
Patented June 29, 1965

3,191,963
RETRACTABLE AXLE FOR VEHICLE LOAD DISTRIBUTION
Evan S. Prichard, Newport Beach, Calif., assignor to Challenge-Cook Bros., Incorporated, Los Angeles, Calif., a corporation of California
Filed Jan. 13, 1964, Ser. No. 337,283
4 Claims. (Cl. 280—81)

This invention relates to a retractable axle for a load-carrying vehicle and, more particularly, to the combination of a wheeled vehicle and a wheeled vehicle body frame extension pivotally mounted on the vehicle, with means interposed between the main vehicle and the body frame extension for distribution of a part of the vehicle's weight load from the main vehicle to the body frame extension and, alternately, for pivotal elevation of the body frame extension clear of the ground.

A single truck vehicle has the distinct advantage of being substantially more maneuverable than a truck-trailer combination or a truck and semi-trailer combination, but due principally to vehicle highway regulations which are concerned with axle weight-load characteristics, and also due to problems of proper transit weight distribution, the carrying capacity of a single truck vehicle is restricted, and pay-load is thereby limited.

Means are herein disclosed for retaining the maneuverability characteristics of a truck vehicle while effectively distributing part of the weight load carried by the truck to a pivoted trailing body frame extension by rearward and downward force applied from the truck to the trailing vehicle, together with means for effectively distributing such weight load not only to the trailing body frame extension but also to a pivoted wheeled structure mounted at the forward end of the truck body frame and extending ahead of the truck, also without sacrifice of maneuverability, said trailing structure and said leading structure being elevatable clear of the ground when weight distribution thereto is no longer desired as, for instance, when off-highway operation of the truck in a confined area is to be accomplished.

It is, therefore, an object of the present invention to provide a load-carrying vehicle having the maneuverability advantages of a truck, but additionally having increased wheel length and improved cargo weight distribution characteristics during transit, these advantages being provided by truck body frame extensions, so that a larger pay-load may be carried by the truck than is normally permitted by motor vehicle highway restrictions and regulations and axle weight-load capacities.

It is still another object of the invention to provide a vehicle in which part of the over-all weight of the vehicle is borne by a body frame extension or extensions, said body frame extension or extensions being elevatable clear of ground contact when desired.

It is yet another object of the invention to provide a truck and body frame extension or extensions of the character described which have the turning radius characteristics of a truck without such extension or extensions.

It is a further object of the invention to provide a body frame extension or extensions readily mountable on a standard truck chassis so as to increase the over-all wheel length dimensions of the truck and provide means for cargo weight distribution from the truck to the extension or extensions.

With these and other objects in view, the invention consists of the construction, arrangement and combination of the various elements of the device whereby the objects contemplated are attained, as hereinafter set forth, pointed out in the appended claims, and illustrated in the accompanying drawings:

Figure 1:
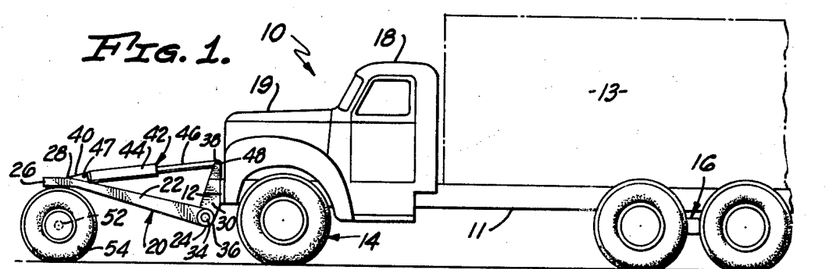
FIG. 1 is a side elevational view of the front end of a truck showing a front body frame extension of the present invention mounted thereon and in transit position.

With particular reference to the form of the device of the present invention, illustrated in FIGS. 1–4 of the drawings, a truck, generally designated 10, has a body frame 11, the body frame 11 having a forward end 12. A truck body 13 suitable for carrying cargo is mounted on the body frame 11. The truck 10 has a forward steering wheel assembly 14, a rear wheel assembly 16 (which, as illustrated in FIG. 1, may be a standard tandem rear wheel assembly), an operator's cab 18, and an engine hood 19.

A body frame extension, generally designated 20 has side frame members 22, in turn having rear ends 24 and forward ends 26. Preferably the forward ends 26 convergs and are suitably joined by a transverse cross member 27, so that a substantially triangular frame structure is provided, although it will be readily seen that a frame structure of other configuration, such as a rectangular frame structure, may be utilized. The side frame members 22 may be goose-necked, as at 28, adjacent the forward ends 26.

Figure 2:
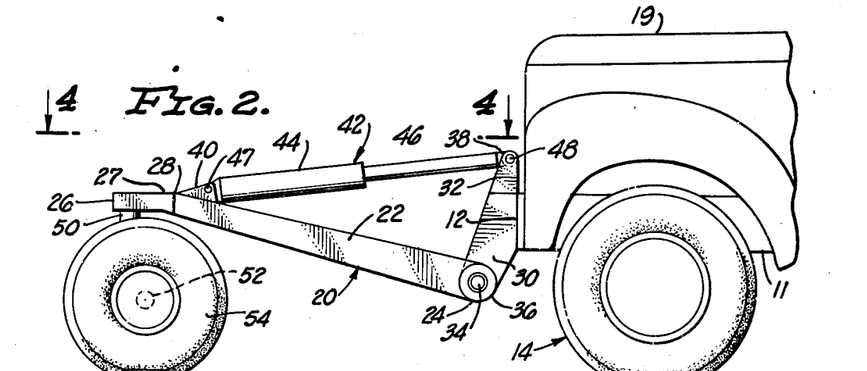
FIG. 2 is an enlarged side elevational view of the body frame extension of FIG. 1 in the transit position illustrated in FIG. 1.
Figure 3:
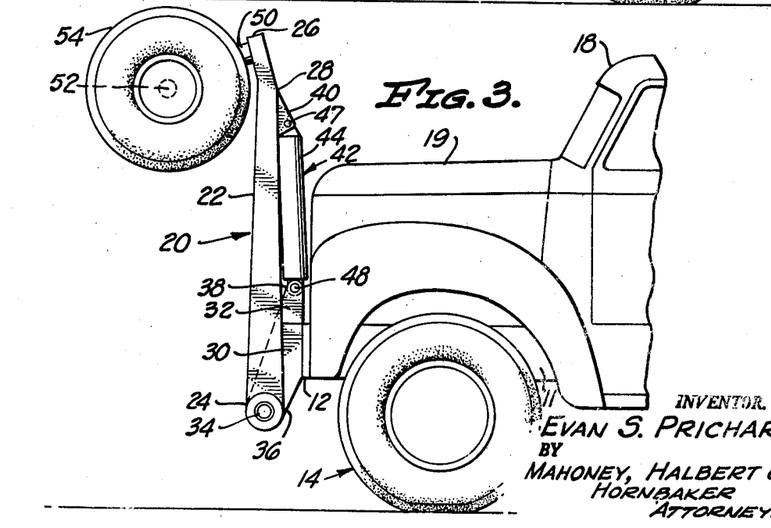
FIG. 3 is a side elevational view of the body frame extension of FIG. 2, but in elevated position.

The rear ends 24 of the side frame members 22 of the frame extension 20 are pivotally mounted on opposite sides of the forward end 12 of the body frame 11, which pivotal mounting may be accomplished by providing a pair of brackets 30 mounted on opposite sides of the forward end 12 of the body frame 11, and a pair of brackets 32 mounted at substantially the center of said forward end 12 with transverse members or cross-bars 34 disposed between each of the brackets 32 and its adjacent bracket 30, the ends 24 of the side frame members 22 being mounted for pivotal movement on the cross-bars 34. As illustrated in FIGS. 1–3 of the drawings, the brackets 30 and 32 are preferably disposed on the body frame 11 with the lower ends 36 of the brackets 30 and 32 extending below the body frame 11 and with the cross-bars 34 mounted at said lower ends 36, so that the side frame members 22, mounted on the cross-bars 34, extend at an upwardly inclined angle. The upper ends 38 of the brackets 32 preferably extend above the body frame 11.

A pair of trunnions 40 are mounted on the cross member 27 of the frame extension 20, and a reciprocating cylinder and piston assembly 42, having a cylinder 44, a piston (not shown) disposed for reciprocal movement within the cylinder 44, and a piston rod 46, the assembly being pivotally mounted at one end of the cylinder 44 on a transverse bar 47 between the trunnions 40, and also pivotally mounted at the free protruding end of the piston rod 46 on a transverse member or bar 48 between the upper ends 38 of the brackets 32.

Reciprocating power means, such as hydraulic fluid pressure lines from a hydraulic power source (not illustrated) are suitably connected to the cylinder 44.

Figures 4, 9, 10, 11:
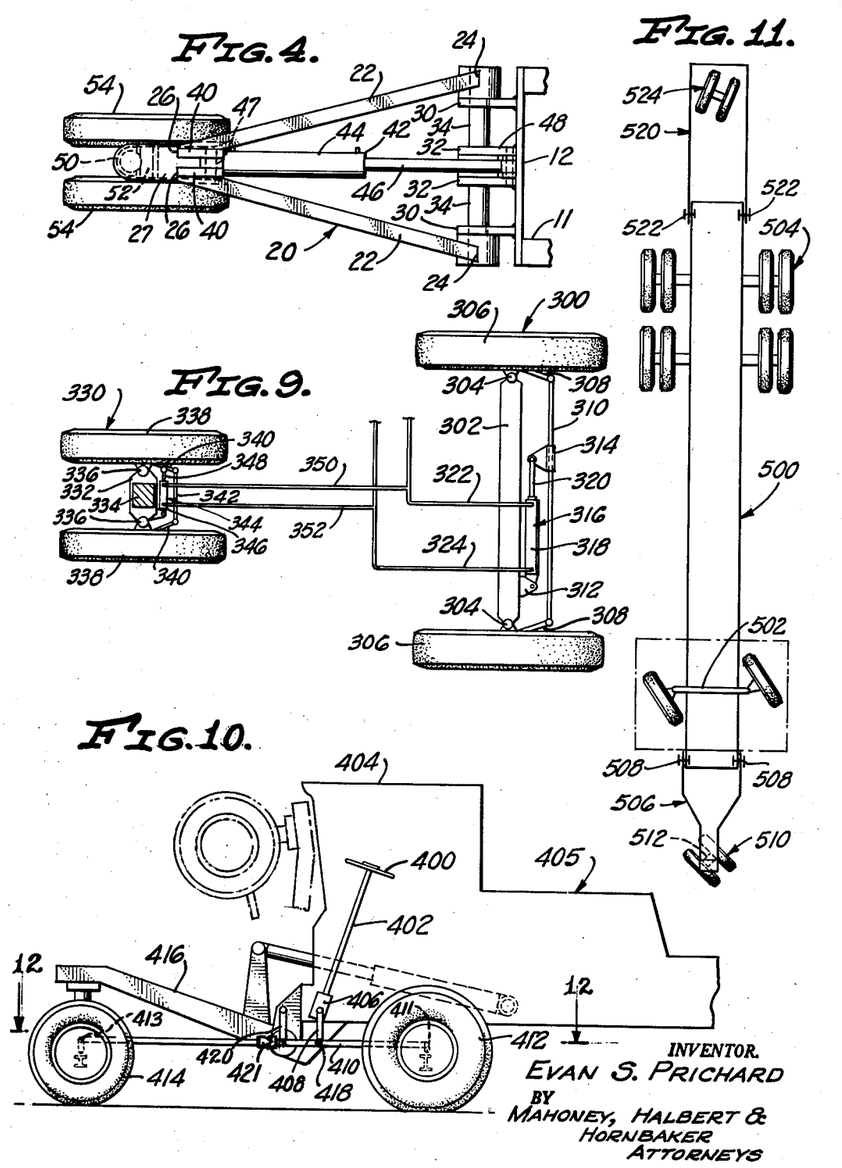
FIG. 4 is a plan view taken on the line 4—4 of FIG. 2.
FIG. 9 is a diagrammatic representation of hydraulic steering means for the ground-contacting wheels of the front body frame extension of the present invention.
FIG. 10 is a diagrammatic representation of mechanical steering means for said ground-contacting wheels.
FIG. 11 is an illustrative plan view showing the turning radius charateristics of the device of the present invention.

A swivel pin 50 is mounted on and extends vertically downwardly from the transverse cross member 27, and at the lower end of the pin 50 an axle 52 is mounted by any suitable means, the axle 52 being preferably offset rearwardly from the longitudinal axis of the pin 50, as best illustrated in FIG. 4 of the drawings. A pair of ground-contacting wheels 54 are mounted on the axle 52, the wheels 54 being disposed on opposite sides of the pin 50.

In operation of the device illustrated in FIGS. 1–4 of the drawings, when it is desired to distribute a part of the cargo weight load of the truck 10 to the body frame extension 20, power is applied to the cylinder 44 to extend the piston rod 46, a forward and downward pressure being thus exerted on the body frame extension 20, a substantial part of the weight load of the truck 10 being thus distributed to the axle 52, while the wheels 54 are maintained in ground contact during transit.

When it is desired to shorten the over-all wheel length between the axle 52 and the tandem rear wheel assembly 16 as, for instance, when the vehicle moves off-highway and into a confined area, the application of power to the cylinder 44 is reversed so as to retract the piston rod 46, whereupon the body frame extension 20 will be elevated, as illustrated in FIG. 3 of the drawings, with the wheels 54 clear of the ground.

In the form of the invention illustrated in FIGS. 5 and 6 of the drawings, in addition to the forwardly disposed body frame extension 20 hereinabove described in detail, the truck 10 may have mounted thereon a trailing open body frame extension generally designated 60. The trailing body frame extension 60 has side frame members 62 having rear ends 64 and forward ends 66. The forward ends 66 of the side frame members 62 are suitably pivotally mounted on opposite sides of the rear end 67 of the body frame 11 of the truck 10, as by mounting on a transverse bar 68 disposed between trunnions 69 mounted on opposite sides of the body frame 11 adjacent the rear end 67 thereof. An upwardly and rearwardly inclined bracket 70 is mounted on the forward end 66 of one of the side frame members 62 and disposed so as to form with said side frame member 62 a bell-crank lever. The bracket 70 has an upper end 72.

A trunnion 74 is mounted on the body frame 11 forwardly of the pivotal mounting of the trailing body frame extension 60 thereon, and a reciprocating cylinder and piston assembly 76, having a cylinder 77, a piston (not shown) disposed for reciprocal movement within the cylinder 77, and a piston rod 78, is interposed between the trunnion 74 and the bracket 70, the cylinder 77 being pivotally mounted at one end thereof on the trunnion 74, and the protruding end of the piston rod 78 being pivotally mounted adjacent the upper end 72 of the bracket 70.

Reciprocating power means, such as hydraulic fluid pressure lines from a hydraulic power source (not illustrated) are suitably connected to the cylinder 77.

The side frame members 62 converge rearwardly and are joined at their rear ends 64 by a cross member 80 to form a substantially triangular frame structure, although it will be readily seen that a frame structure of other configuration, such as a rectangular frame structure, may be utilized. The side frame members 62 may be goose-necked, as at 82, adjacent the rear ends 64.

A swivel pin 84 is mounted on and extends downwardly from the transverse cross member 80, and at the lower end of the pin 84 and axle 86 is mounted by any suitable means, the axle 86 being preferably offset rearwardly from the longitudinal axis of the pin 84. A pair of ground contacting wheels 88 are mounted on the axle 86, the wheels 88 being disposed on opposite sides of the pin 84.

Figure 5:
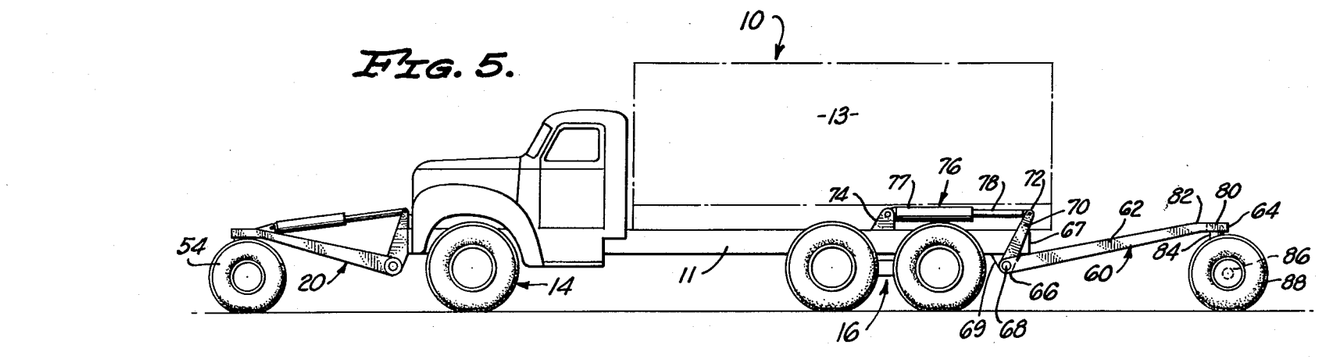
FIG. 5 is a side elevational view similar to FIG. 1, but showing a trailing body frame extension as well as a front body frame extension mounted on the truck.
Figure 6:
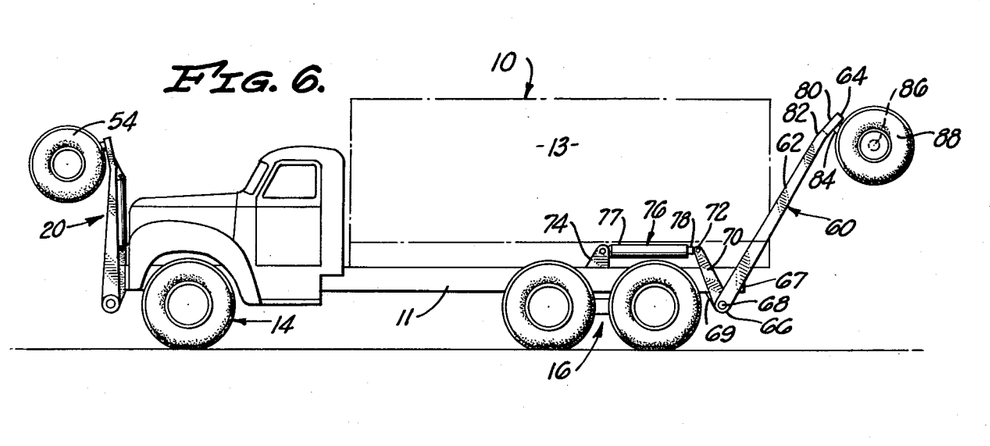
FIG. 6 is a view similar to FIG. 5, but showing both the front body frame extension and the trailing body frame extension in elevated position.

In operation of the form of the device illustrated in FIGS. 5 and 6 of the drawings, either the forward body frame extension 20 alone, or the trailing body frame extension 60 alone, or both the forward body frame extension 20 and the trailing body frame extension 60 simultaneously, may be utilized to effect weight load distribution from the truck 10 to either or both of said body frame extensions, and similarly either of the said body frame extensions may be elevated separately, or both of them may be elevated simultaneously. When weight distribution to the front body frame extension 20, or elevation of the front body frame extension 20, is desired, the operation applicable thereto is the same as that hereinabove described with reference to the device as illustrated in FIGS. 1–4 of the drawings. When weight distribution to the trailing body frame extension 60 is desired, power is applied to the cylinder 77 to extend the piston rod 78, a rearward and downward pressure being thus exerted on the trailing body frame extension 60, a substantial part of the weight load of the truck 10 being thus distributed to the axle 86, while the wheels 88 are maintained in ground contact during transit, as illustrated in FIG. 5 of the drawings.

When it is desired to shorten the over-all wheel length between the steering axle of the forward steering wheel assembly 14 of the truck 10 and the axle 86 (or between the axle 52 of the forward body frame extension 20 and the axle 86, if the forward body frame extension 20 is lowered for weight distribution thereto), as, for instance, when the vehicle is being backed into a confined area, the application of power to the cylinder 77 is reversed so as to retract the piston rod 78, whereupon the trailing body frame extension 60 will be elevated, as illustrated in FIG. 6 of the drawings, with the wheels 88 clear of the ground.

Figure 7:
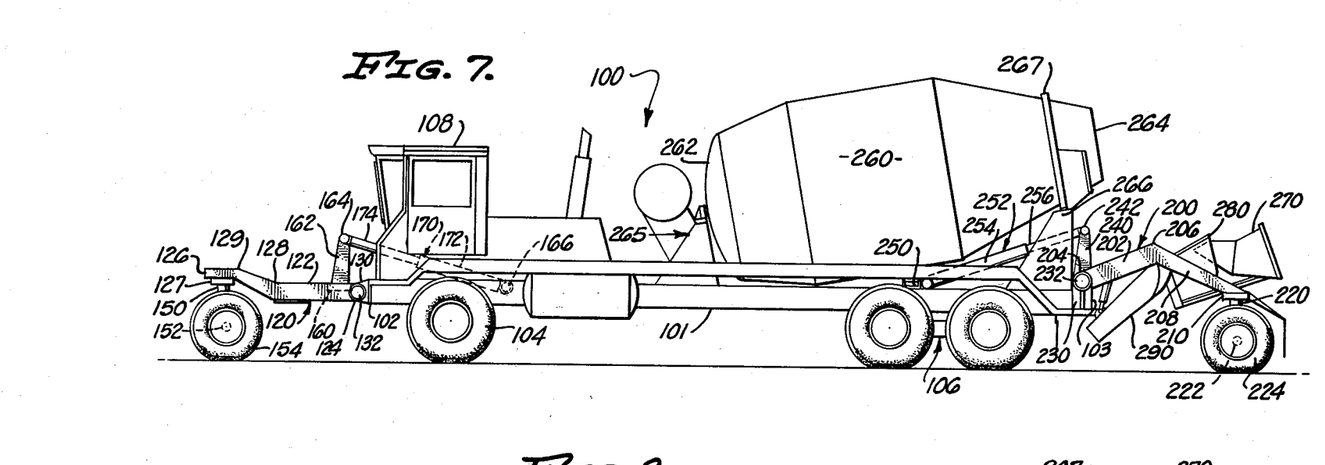
FIG. 7 is a side elevational view of an alternative form of the present invention in transit position.
Figure 8:
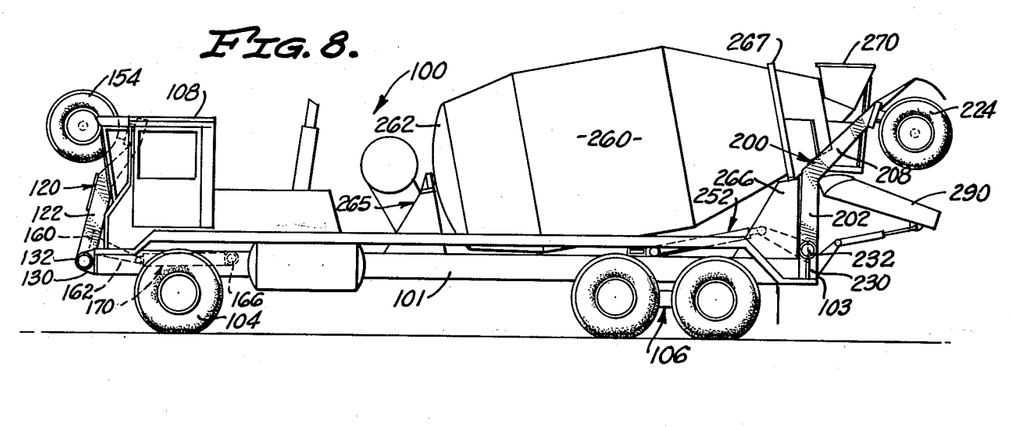
FIG. 8 is a view similar to FIG. 7, but showing both the front body frame extension and the trailing body frame extension in elevated positions.
Figure 12:
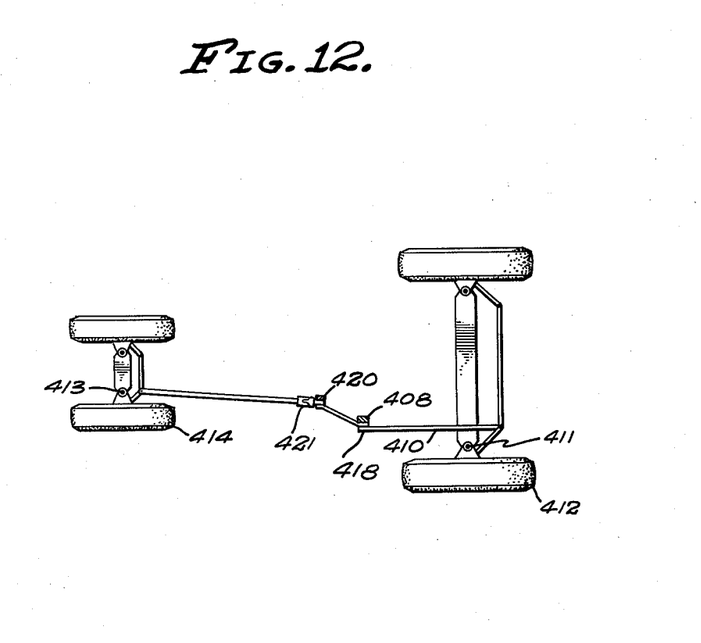
FIG. 12 is a plan view of the invention taken on line 12—12 of FIG. 10.

Referring to the alternative form of construction illustrated in FIGS. 7 and 8 of the drawings, a truck, generally designated 100 and which, as illustrated, may be a transit concrete mixer, has a body frame 101, the body frame 101 having a forward end 102 and a rear end 103. The truck 100 has a forward steering wheel assembly 104, a rear wheel assembly 106 (which, as illustrated, may be a standard tandem rear wheel assembly), and an operator's cab 108 (which may be a half-cab) is mounted adjacent the forward end 102 of the body frame 101.

A body frame extension, generally designated 120, has side frame members 122, in turn having rear ends 124 and forward ends 126. Preferably, the forward ends 126 converge and are suitably joined by a transverse cross member 127 which either may be in the same horizontal plane as that of the forward ends 126 or may be mounted below the ends 126, as shown in FIG. 7 of the drawings, as desired, so that a substantially triangular frame structure is provided, although it will be readily seen that a frame structure or other configuration, such as a rectangular frame structure, may be utilized. The side frame members 122 may be goose-necked, as at 128 and 129, adjacent the forward ends 126.

The rear ends 124 of the side frame members 122 of the frame extension 120 are pivotally mounted on opposite sides of the forward end 102 of the body frame 101, which pivotal mounting may be accomplished by providing a pair of brackets 130 mounted on opposite sides of the forward end 102 of the body frame 101, and a transverse rod 132 disposed between said brackets 130, the ends 124 of the side frame members 122 being mounted for pivotal movement on or with said rod 132, generally in alignment with the body frame 101.

A swivel pin 150 is mounted on and extends vertically downwardly from the transverse cross member 127, and at the lower end of the pin 150 an axle 152 is mounted by any suitable means, the axle 152 being preferably offset rearwardly from the longitudinal axis of the pin 150. A pair of ground-contacting wheels 154 are mounted on the axle 152, the wheels 154 being disposed on opposite sides of the pin 150.

A transverse frame member 160 interconnects the side frame members 122 adjacent the rear ends 124 of said side frame members 122, and mounted on said transverse frame member 160 at substantially the center thereof, and protruding upwardly therefrom, is a bracket 162 having an upper end 164 and suitably mounted on the body frace 101 rearwardly of the forward end 102 of the body frame 101 is a transverse member or rod 166.

Interposed between the bracket 162 and the rod 166 is a reciprocating cylinder and piston assembly 170 having a cylinder 172, a piston (not shown) disposed for reciprocal movement within the cylinder 172, and a piston rod 174, the assembly being pivotally mounted at one end of the cylinder 172 on the transverse rod 166 at substantially the center of said transverse rod 166, and also pivotally mounted at the free end of the piston rod 174 on the upper end 164 of the bracket 162.

Reciprocal power means, such as hydraulic fluid pressure lines from a hydraulic power source (not illustrated), are suitably connected to the cylinder 172.

In operation of the forward body frame extension 120, as illustrated in FIG. 7 of the drawings, when it is desired to distribute a part of the weight load of the truck 100 to the forward body frame extension 120, power is applied to the cylinder 172 to extend the piston rod 174, a forward and downward pressure being thus exerted on the forward body frame extension 120, and a substantial part of the weight load of the truck 100 being thus distributed to the axle 152, while the wheels 154 are maintained in ground contact during transit.

When it is desired to shorten the overall wheel length between the axle 152 and either the tandem rear wheel assembly 106 or the axle of a trailing body frame extension, hereinafter described, as for instance, when the vehicle moves off a highway and into a confined area, the application of power to the cylinder 172 is reversed so as to retract the piston rod 174, whereupon the forward body extension 120 will be elevated, as illustrated in FIG. 8 of the drawings, with the wheels 154 clear of the ground. If the cab 108 is what is known in the industry as a "half-cab," that is, a cab extending laterally over approximately one-half of the width of the truck, the forward ends 126 of the side frame members 122 of the forward body frame extension 120 and the wheels 154 will be disposed laterally of the half-cab 108 in fully elevated position, so that the forward view of an operator seated in the half-cab 108 will be unimpeded.

If it is desired to utilize a trailing body frame extension as well as the forward body frame extension 120 hereinabove described, said trailing body frame extension, generally designated 200, is provided. Trailing body frame extension 200 has first side frame members 202, said first side frame members 202 being disposed substantially parallel to each other and having forward ends 204 and rear ends 206. Second side frame members 208 are mounted on the rear ends 206 of the first side frame members 202 so as to form an obtuse angle between the first side frame members 202 and the second side frame members 208, said second side frame members 208 extending rearwardly in converging relationship toward each other. A cross member 210 interconnects the second side frame members 208 adjacent the rear ends of said second frame members 208.

A swivel pin 220 is generally centrally mounted on the cross member 210 and extends vertically downwardly therefrom. At the lower end of the pin 220 an axle 222 is mounted by any suitable means, the axle 222 being preferably offset rearwardly from the longitudinal axis of the pin 220. A pair of ground-contacting wheels 224 are mounted on the axle 222, the wheels 224 being disposed on opposite sides of the pin 220.

The forward ends 204 of the first side frame members 202 are pivotally mounted on opposite sides of the rear end 103 of the body frame 101, which pivotal mounting may be accomplished by providing a pair of brackets 230 mounted on opposite sides of the rear end 103 of the body frame 101 and a transverse rod 232 pivotally mounted on and disposed between the brackets 230, the ends 204 of the first side frame members 202 being mounted on the rod 232.

A bracket 240 is mounted on the rod 232 at substantially the center of the rod 232, said bracket 240 extending upwardly from said rod 232. The bracket 240 has an upper end 242.

A transverse frame member 250 is mounted on the body frame 101 forwardly of the rear end 103 of the body frame 101. A reciprocating cylinder and piston assembly 252 is interposed between the transverse frame member 250 and the end 242 of the bracket 240, the reciprocating cylinder and piston assembly 252 having a cylinder 254, a piston (not shown) disposed for reciprocal movement with the cylinder 254, and a piston rod 256, the assembly being pivotally mounted at one end of the cylinder 254 on the transverse frame member 250 at substantially the center of said transverse frame member 250, and also pivotally mounted at the free protruding end of the piston rod 256 on the end 242 of the bracket 240.

Reciprocal power means, such as hydraulic fluid pressure lines from a hydraulic power source (not illustrated), are suitably connected to the cylinder 254.

When the invention is applied to a transit mixer, as illustrated in FIGS. 7 and 8 of the drawings, there is rotatably mounted on body frame 101 a mixer drum 260, which has a forwardly disposed closed end 262 and a rearwardly disposed, upwardly inclined open end 264 adapted to receive and discharge cargo. In the manner which has become standard in the transit mixer industry, the drum 260 is rotatably supported on body frame 101 at its forward closed end 262, as by a drive mechanism, generally designated 265 (no particular claim being made to the drive mechanism employed). Drum 260 is rearwardly supported on truck frame 101, also in a manner which has become standard in the industry, as by a pair of stanchions 266 which support rollers (not illustrated), which rollers in turn bear on a ring 267 mounted externally on drum 260 adjacent open end 264 thereof. Open end 264 of the drum 260 is disposed adjacent the vertical plane of rear end 103 of body frame 101 so that it will be readily available for loading and discharge of cargo.

If it is desired to carry the loading and discharge mechanisms of the transit mixer on the trailing body frame extension 200, there are mounted on and supported by the trailing body frame extension 200 a loading hopper 270, a discharge accumulator 280, and a discharge chute 290, said hopper 270, discharge accumulator 280, and discharge chute 290 being disposed on said trailing body frame extension 200 so that, when the rig is in transit, as illustrated in FIG. 7 of the drawings, said hopper 270, accumulator 280, and chute 290 extend generally rearwardly from body frame 101, but when loading or discharge of cargo is to be accomplished, as illustrated in FIG. 8 of the drawings, said hopper 270, accumulator 280, and chute 290 are elevated by the pivotal elevation of the trailing body frame extension 200 in the manner hereinafter described to operating position closely adjacent the open end 264 of the drum 260.

In operation of the trailing body frame extension 200, as illustrated in FIG. 7 of the drawings, when it is desired to distribute a part of the weight load of the truck 100 to the trailing body frame extension 200, power is applied to the cylinder 254 to extend the piston rod 256, a rearward and downward pressure being thus exerted on the trailing body frame extension 200, a substantial part of the weight load of the truck 100 being thus distributed to the axle 222, while the wheels 224 are maintained in ground contact during transit.

When it is desired to shorten the overall wheel length between either the steering axle of the forward steering wheel assembly 104 and the axle 222 of the trailing body frame extension 200, or between the axle 152 of the forward body extension 120 and the axle 222 of the trailing body frame extension 200, as, for instance, when the vehicle moves off highway and is backing into a confined area, or when loading or discharge of the drum 260 is to be accomplished, the application of power to the cylinder 254 is reversed so as to retract the piston rod 256, whereupon the trailing body frame extension 200 will be elevated, as illustrated in FIG. 8 of the drawings, with the wheels 224 clear of the ground.

The axle and wheel assemblies of the forward body frame extensions as hereinabove described are of free-swiveling or caster type construction. If desired, said assemblies may be steerable by hydraulic means, as illustrated in FIG. 9 of the drawings, or by mechanical means, as illustrated in FIG. 10 of the drawings.

Referring to FIG. 9, a truck forward steering wheel assembly, generally designated 300, has an axle 302, at the ends of which standard steering wheel king pins 304 are provided. Wheels 306 are suitably mounted on the king pins 304. The arms 308 are connected to the king pins 304 and said wheel mountings, and a tie rod 310 interconnects the tie arms 308. Mounted on the axle 302 is a first bracket 312, and mounted on the tie rod 310 is a second bracket 314. Interposed between the first bracket 312 and the second bracket 314 is a hydraulic cylinder and piston assembly 316 comprising a cylinder 318, a piston (not shown) disposed in the cylinder 318 for reciprocal movement therein, and a piston rod 320. The cylinder 318 is pivotally connected to the bracket 312, and the free, protruding end of the piston rod 320 is pivotally connected to the bracket 314. Hydraulic fluid pressure lines 322 and 324 lead from a source of hydraulic fluid (not shown) to opposite ends of the cylinder 318.

The forward body frame extension has a wheel assembly, generally designated 330. The wheel assembly has an axle 332 which is mounted on a vertically disposed pin 334 depending from the body frame extension. At the ends of the axle 332 standard steering wheel king pins 336 are provided. Wheels 338 are suitably mounted on the king pins 336. Tie arms 340 are connected to the king pins 336 and said wheel mountings, and a tie rod 342 interconnects the tie arms 340. A hydraulic cylinder and piston assembly 344 comprising a cylinder 346, a piston (not shown) disposed in the cylinder 346 for reciprocal movement therein, and a piston rod 348, is interposed between the axle 332 and either one of the tie arms 340 (as illustrated) or the tie rod 342, the cylinder 346 being pivotally mounted on the axle 332, and the free, protruding end of the piston rod 348 being pivotally mounted on either the said tie arm 340 or the tie rod 342, as the case may be.

Interconnecting the hydraulic fluid pressure line 322 and one end of the cylinder 346 is a hydraulic fluid pressure line 350, and interconnecting the hydraulic fluid pressure line 324 and the other end of the cylinder 346 is a hydraulic fluid pressure line 352.

It will be seen that the application of power steering to the truck steering wheel assembly 300 will be duplicated in the wheel assembly 330 of the forward body frame extension. It will also be seen that, although not illustrated, similar provisions for power steering to the wheel assembly of a trailing body frame extension may also be provided, if desired.

Referring to FIG. 10, a steering wheel 400 and a steering post 402 are disposed in a truck cab 404 of a truck 405. Mounted on the steering post 402 is a gear box 406 to which a link 408 is connected. A steering rod 410 is operatively connected at one end thereof to a standard king pin and tie rod assembly 411 of a truck forward steering wheel assembly 412, and operatively connected at the other end thereof to a standard king pin and tie rod assembly 413 of a steering wheel assembly 414 of a forward body frame extension 416. The link 408 is pivotally connected to the steering rod 410 intermediate the ends of the steering rod 410, as at 418, and operates the steering rod 410 in the standard manner. If desired, the steering rod 410 may be pivotally supported intermediate its ends by a link 420 mounted on the truck 405. There is a universal joint 421 on the rod 410 forward of the link 420.

It will be seen that mechanical operation of the truck steering wheel assembly 412 will be duplicated in the steering wheel assembly 414. It will also be seen that, although not illustrated, similar interlocked provisions for mechanical steering of the wheel assembly of a trailing body frame extension may also be provided, if desired.

In FIG. 11 of the drawings, for ease of description, new reference numbers are applied to parts of a vehicle common to all forms of the invention hereinabove described.

A truck body frame 500 has a forward steering wheel assembly 502 and a tandem rear wheel assembly 504. Mounted on the front end of the body frame 500 is a forward body frame extension 506. Forward body frame extension 506 is mounted on both sides of the forward end of body frame 500 for pivotal elevation, as at 508, but not for lateral movement relative to body frame 500. Ground-contacting wheel assembly 510 is swivelly or steerably mounted on forward body frame extension 506, and has an axle 512 disposed transversely to the body frame extension 506 when the vehicle is proceeding forwardly or rearwardly on a straight line of travel. Because there is no lateral movement of the forward body frame extension 506 relative to the body frame 500, when the steering wheel assembly 502 are turned, the wheels of the wheel assembly 510 will also turn at a similar angle, the entire rig will turn in the radius illustrated in FIG. 11, and the forward body frame extension 506 will not separately follow a wider radius of turn.

If a trailing body frame extension, such as a trailing body frame extension 520, is added to the rig, similar turning radius characteristics will be present. Trailing body frame extension is mounted on both sides of the rear end of body frame 500 for pivotal elevation, as at 522, but not for lateral movement relative to body frame 500. Ground-contacting wheel assembly 524 is swivelly or steerably mounted on trailing body frame extension 520, and has an axle 526 disposed transversely to the body frame extension 520 when the vehicle is proceeding forwardly or rearwardly on a straight line of travel. As in the case of the forward body frame extension 506, because there is no lateral movement of the trailing body frame extension 520 relative to the body frame 500, when the steering wheels of the steering wheel assembly 502 are turned, the wheels of the wheel assembly 524 will also turn at a similar angle, the entire rig will turn in the radius illustrated in FIG. 11, and the trailing body frame extension 520 will not separately follow a wider radius of turn.

Although the invention has been herein shown and described in what are conceived to be the most practical and preferred embodiments thereof, it will be recognized that departures may be made therefrom within the scope of the invention, which is not to be limited to the details disclosed herein, but is to be accorded the full scope of the claims so as to embrace any and all equivalent structures and devices.

I claim:

1. A vehicle which comprises: a body frame; forward steering wheels mounted on the body frame; rear ground-contacting wheels mounted on the body frame; a body frame extension having side frame members, the forward ends of the side frame members converging and the rear ends of the side frame members being pivotally connected to the body frame on opposite sides of the body frame adjacent the front end of the body frame; a first transverse member interconnecting the forward ends of the side frame members; ground-contacting wheels mounted on the first transverse member; a second transverse member interconnecting the side frame members adjacent the rear ends of the side frame members; a bracket mounted on the second transverse member substantially at the center of the second transverse member and protruding upwardly therefrom; a transverse member mounted on the body frame rearwardly of the front end of the body frame; and reciprocating power means pivotally mounted on the transverse member of the body frame substantially at the center of the transverse member, and pivotally mounted on the bracket on the second transverse member of the body frame extension, said power means being disposed to bear forwardly and downwardly on the body frame extension so as to distribute a portion of the weight carried by the body frame to said body frame extension and so as to maintain the wheels on the body frame extension in contact with the ground, and alternately so as to pivotally elevate the body frame extension and elevate the wheels on the body frame extension clear of the ground.

2. A vehicle as defined in claim 1, wherein said reciprocating power means comprises a fluid pressure cylinder and piston assembly.

3. A vehicle which comprises: a body frame; forward steering wheels mounted on the body frame; rear ground-contacting wheels mounted on the body frame; a pair of vertically disposed brackets mounted on opposite sides of the front of said body frame, the lower end of each of said brackets extending below said body frame; a forwardly extending body frame extension having side frame members, the forward ends of the side frame members converging and the rear ends of each of said side frame members being pivotally connected to the lower end of one of said brackets; a transverse member interconnecting the forward ends of the side frame members of the forward body frame extension; ground-contacting wheels mounted on and depending from the transverse member; reciprocating power means pivotally mounted on the body frame substantially at the center of the front of said body frame, and pivotally mounted on the forward body frame extension substantially at the center of said transverse member, said power means being disposed to bear forwardly and downwardly on the forward body frame extension so as to distribute a portion of the weight carried by the body frame to said forward body frame extension and so as to maintain the wheels on the forward body frame extension in contact with the ground, and alternately so as to pivotally elevate the forward body frame extension and elevate the wheels on the forward body frame extension clear of the ground; a rearwardly extending body frame extension having side frame members, the rearward ends of the side frame members converging and the forward ends of each of said side frame members being pivotally connected to the body frame of the vehicle on opposite sides of the said body frame adjacent the rear end of the body frame; a transverse member interconnecting the rearward ends of the side frame members of the rearward body frame extension; ground-contacting wheels mounted on and depending from said transverse member; an upwardly extending bracket mounted on one of the side frame members of the rearward body frame extension adjacent the forward end thereof; and reciprocating power means pivotally mounted on the body frame forward of the rear end of the body frame and pivotally mounted on the bracket on the rearward body frame extension, said last-mentioned power means being disposed to bear rearwardly and downwardly on the rearward body frame extension so as to distribute a portion of the weight carried by the body frame to the rearward body frame extension and so as to maintain the rearward body frame extension wheels in contact with the ground, and alternately so as to pivotally elevate the rearward body frame extension and elevate the rearward body frame extension wheels clear of the ground.

4. A vehicle which comprises: a body frame; forward steering wheels mounted on the body frame; rear ground-contacting wheels mounted on the body frame; a forwardly extending body frame extension having side frame members, the forward ends of the side frame members converging and the rear ends of each of said side frame members being pivotally connected to the vehicle body frame at opposite sides of the front end of the vehicle body frame; a first transverse member interconnecting the forward ends of the side frame members of the forward body frame extension; ground-contacting wheels mounted on and depending from said first transverse member; a second transverse member interconnecting said side frame members adjacent the rear ends of the side frame members; a bracket mounted on said second transverse member substantially at the center of said second transverse member and protruding upwardly therefrom; a third transverse member on said truck body frame rearwardly of the pivotal connection of the forward body frame extension to said truck body frame; reciprocating power means pivotally mounted on the body frame substantially at the center of said third transverse member, and pivotally mounted on the bracket on the forward body frame extension substantially at the center of said bracket, said power means being disposed to bear forwardly and downwardly on the forward body frame extension so as to distribute a portion of the weight carried by the body frame to said forward body frame extension and so as to maintain the wheels on the forward body frame extension in contact with the ground, and alternately so as to pivotally elevate the forward body frame extension and elevate the wheels on the forward body frame extension clear of the ground; a rearwardly extending body frame extension having side frame members, the rearward ends of the side frame members converging and the forward ends of each of said side frame members being pivotally connected to the body frame of the vehicle on opposite sides of the said body frame adjacent the rear end of the body frame; a transverse member interconnecting the rearward ends of the side frame members of the rearward body frame extension; ground-contacting wheels mounted on and depending from said transverse member; an upwardly extending bracket mounted on one of the side frame members of the rearward body frame extension adjacent the forward end thereof; and reciprocating power means pivotally mounted on the body frame forward of the rear end of the body frame and pivotally mounted on the bracket on the rearward body frame extension, said last-mentioned power means being disposed to bear rearwardly and downwardly on the rearward body frame extension so as to distribute a portion of the weight carried by the body frame to the rearward body frame extension and so as to maintain the rearward body frame extension wheels in contact with the ground, and alternately so as to pivotally elevate the rearward body frame extension and elevate the rearward body frame extension wheels clear of the ground.

References Cited by the Examiner

UNITED STATES PATENTS

| 1,534,810 | 4/25 | Rivas | 180—22 |
| 2,590,787 | 3/52 | Nickles | 212—145 X |
| 2,612,385 | 9/52 | Plitz | 280—419 |
| 2,682,153 | 6/54 | Fink | 280—43.23 X |
| 2,750,204 | 6/56 | Ohrmann | 280—43.23 X |

(Other references on following page)

| | | | | | | |
|---|---|---|---|---|---|---|
| 2,830,519 | 4/58 | Chandler et al. | 280—43.23 X | 3,004,770 | 10/61 | Bettenhausen  280—150 |
| 2,833,556 | 5/58 | Kling | 280—405 | 3,038,704 | 6/62 | Cook. |
| 2,864,625 | 12/58 | Clements | 280—405 | 3,065,803 | 11/62 | Pierson  280—43.23 X |
| 2,891,331 | 6/59 | Pleska. | | 3,077,356 | 2/63 | Shepherd  280—150.5 X |
| 2,902,289 | 9/59 | North. | | 3,112,100 | 11/63 | Prichard  280—81 X |
| 2,919,928 | 1/60 | Hoffer | 280—81 | | | |
| 2,974,976 | 3/61 | Lyall | 280—405 | | | |
| 2,980,443 | 4/61 | Fina | 280—419 X | | | |

BENJAMIN HERSH, *Primary Examiner.*

KENNETH H. BETTS, A. HARRY LEVY, *Examiners.*